UNITED STATES PATENT OFFICE.

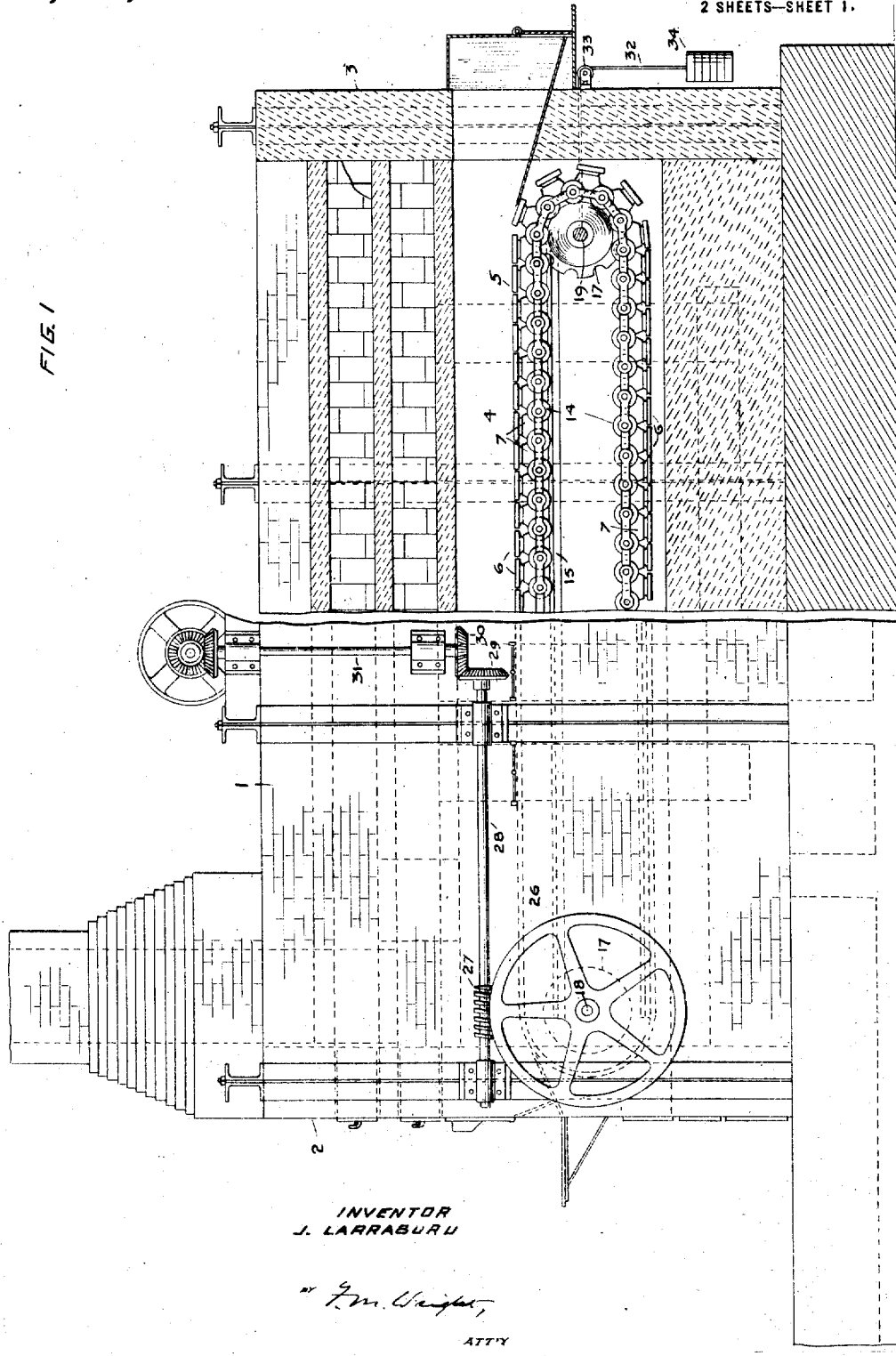

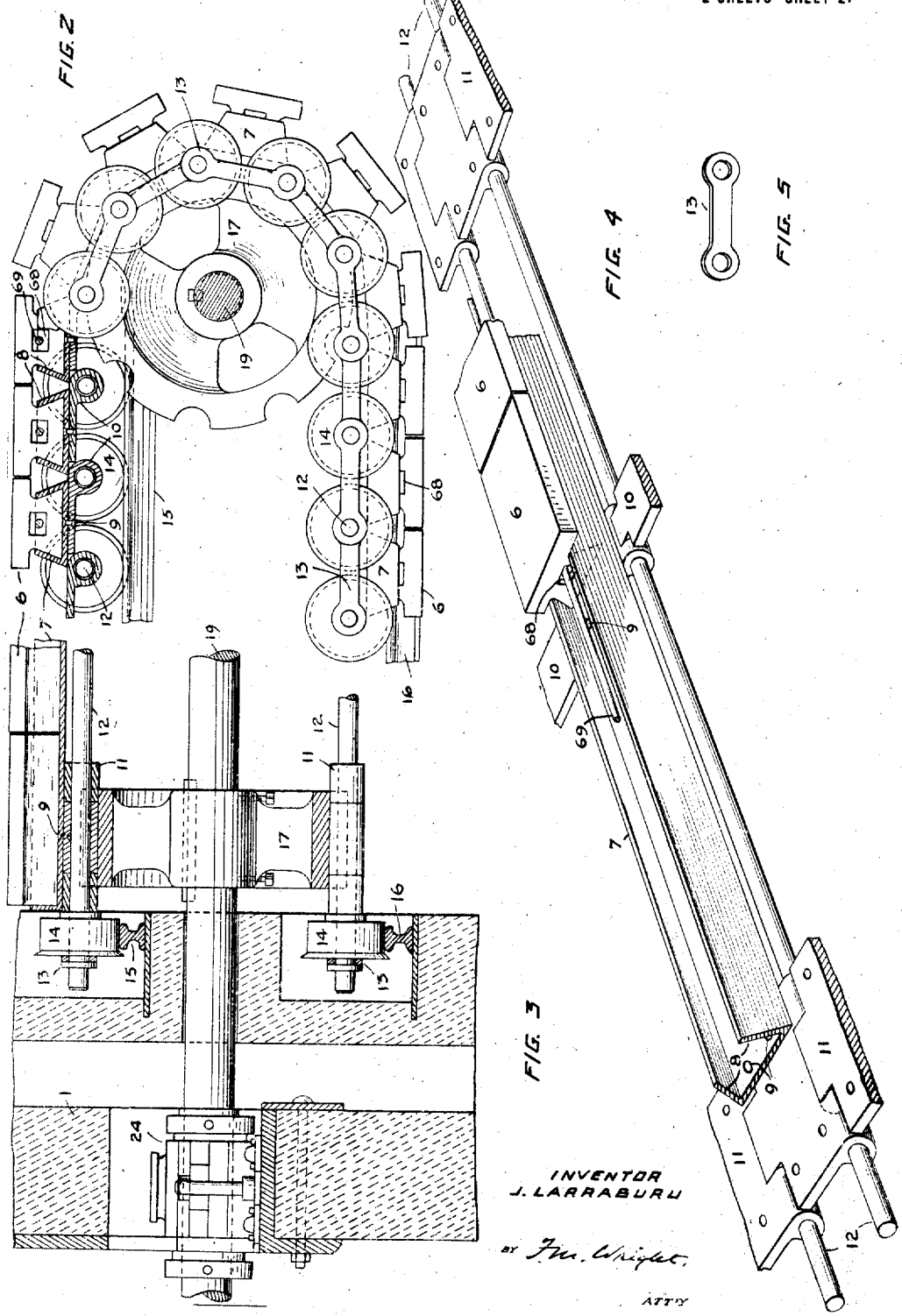

JOHN LARRABURU, OF SAN FRANCISCO, CALIFORNIA, ASSIGNOR TO HYGIENIC BAKING CORPORATION, OF SAN FRANCISCO, CALIFORNIA, A CORPORATION OF CALIFORNIA.

MOVABLE FLOOR FOR BAKERS' OVENS.

1,257,007.  Specification of Letters Patent.  Patented Feb. 19, 1918.

Original application filed April 8, 1916, Serial No. 89,910. Divided and this application filed September 6, 1916. Serial No. 118,604.

*To all whom it may concern:*

Be it known that I, JOHN LARRABURU, a citizen of the United States, residing at San Francisco, in the county of San Francisco and State of California, have invented new and useful Improvements in Movable Floors for Bakers' Ovens, of which the following is a specification.

My invention relates to improvements in baking ovens in which is employed a movable floor upon which the dough is placed at one end and from which the loaves are discharged at the other end, and is a division of an application, Serial No. 89,910, filed by me April 8th, 1915, and confined to the structure of the flues of said oven, the present application relating solely to the movable platform. The object of the invention is to provide an oven of this character in which the movable floor shall be very firmly supported, especially at the center, notwithstanding its great length and width.

In the accompanying drawing, Figure 1 is a broken side elevation of my improved baking oven, certain parts being shown in section; Fig. 2 is an enlarged broken side view of a movable floor; Fig. 3 is a sectional view of the same; Fig. 4 is a broken perspective view of a brick carrier detached; Fig. 5 is a perspective view of a link.

Referring to the drawing, 1 indicates a side wall, 2 the front wall, and 3 the rear wall of a baking oven. 4 indicates the baking chamber in which is a movable floor 5, formed of bricks 6 of special construction carried in brick carriers 7 which extend transversely the full width of the baking chamber, and are channel-shaped in form, the sides 8 of the carriers being inclined from the base toward each other to hold the bricks firmly in place, the inner portion of the bricks being dove-tailed in form to be securely held in said carriers. The bricks are inserted in said carriers at the ends, and, in case of necessity of repair of the bricks, the carriers are moved out of the baking chamber to enable the bricks to be withdrawn. The central and terminal portions of said carriers 7 are riveted, as shown at 9, to hinged members 10, 11, which are hinged together by means of shafts 12, which extend entirely across the baking chamber and are connected to each other by means of links 13 supported in rollers 14, which roll upon upper and lower longitudinally extending rails 15, 16. In the front and rear ends of the baking chamber, sprocket wheels 17 are mounted on a front shaft 18 and a rear shaft 19, the recesses in the peripheries of which sprocket wheels receive shafts 12. The shafts 18, 19 rotate in boxes 24 in recesses of the side walls of the furnace, and the front shaft 18 carries on its ends worm wheels 26 driven by screws 27 on a shaft 28 carrying bevel gears 29 meshing with bevel gears 30 on a shaft 31, driven by a motor, not shown, conveniently located, as upon the top of the oven. The boxes 24 for the rear shaft 19 are drawn rearwardly by cables 32 passing over suitably mounted pulleys 33 and supporting weights 34.

Each brick is formed at its ends with recesses 68 to receive cementitious material, by which bricks in the same brick carrier are caused to adhere to each other, and said bricks have each a hole extending longitudinally therethrough, through which hole is a bar 69 for tying all the bricks together.

I claim:—

1. In a movable floor for bakers' ovens, the combination of transverse brick carriers, bricks carried thereby, and plates secured to the ends of said carrier on the sides thereof remote from said bricks, said plates being formed with hinges whereby successive plates may be hinged together, and rollers journaled upon the projecting ends of the hinge pins for travel upon tracks at either side of the floor.

2. In a movable floor for bakers' ovens, the combination of transverse brick carriers, bricks carried thereby, plates secured to the ends of said carrier on the sides thereof remote from said bricks, said plates being formed with hinges whereby successive plates may be hinged together, and hinge pins extending entirely across the oven floor for hinging the plates at both sides of said floor.

3. An endless, flexible floor for a baker's oven comprising a series of transverse brick carriers detachably receiving bricks, hinges at the ends connecting adjacent carriers together, said hinges including pins in the form of rods extending entirely across the floor and passing through the alined hinges.

4. In a movable floor for bakers' ovens, the combination of transverse brick carriers, bricks carried thereby, plates secured to the ends of said carrier on the sides thereof remote from said bricks, said plates being formed with hinges whereby successive plates may be hinged together, and links connecting the ends of successive hinge pins.

5. An endless, flexible floor for a baker's oven comprising a series of transverse brick carriers detachably receiving bricks, hinges at the ends connecting adjacent carriers together, said hinges including pins in the form of rods extending entirely across the floor and passing through the alined hinges, and rollers journaled upon the projecting ends of the hinge pins for travel upon tracks at either side of the floor.

6. An endless, flexible floor for bakers' ovens, comprising a series of transverse brick carriers, detachably receiving bricks, hinge plates at the ends of the carriers forming also projections to coöperate with sprocket wheels, and pins for connecting adjacent hinge plates together, said pins being in the form of rods extending entirely across the floor, and passing through oppositely alined hinge plates.

7. An endless, flexible floor for a baker's oven made up of a series of transverse brick carriers hinged together, and a series of endwise abutting bricks detachably received in each carrier, each brick having a longitudinally extending aperture and a rod extending through the alined apertures for tying the bricks of each carrier together.

8. An endless, flexible floor for a baker's oven made up of a series of transverse brick carriers hinged together, and a series of endwise abutting bricks detachably received in each carrier, each brick having a longitudinally extending aperture and a rod extending through the alined apertures for tying the bricks of each carrier together, said apertures receiving plastic material around the rod.

JOHN LARRABURU.